United States Patent [19]

Morris

[11] 4,167,196
[45] Sep. 11, 1979

[54] VANDAL-PROOF PLUMBING VALVE ACCESS BOX

[75] Inventor: Earl L. Morris, Whittier, Calif.

[73] Assignee: Acorn Engineering Co., Industry, Calif.

[21] Appl. No.: 844,360

[22] Filed: Oct. 21, 1977

Related U.S. Application Data

[63] Continuation-in-part of Ser. No. 749,882, Dec. 13, 1976, abandoned.

[51] Int. Cl.² .................... F16K 27/10; H02G 3/08
[52] U.S. Cl. .................................. 137/360; 220/3.4; 220/3.8
[58] Field of Search ............ 137/360, 382, 357; 222/173; 220/3.5, 3.8, 3.3, 3.4, 3.6, 327

[56] References Cited

U.S. PATENT DOCUMENTS

| | | | |
|---|---|---|---|
| 1,643,599 | 9/1927 | Auld | 220/241 |
| 2,181,740 | 11/1939 | Reiland | 220/3.4 |
| 2,236,104 | 11/1940 | McIntosh | 137/361 |
| 2,291,719 | 8/1942 | Huehnel | 220/327 |
| 2,333,547 | 11/1943 | Neumann | 220/237 |
| 2,952,271 | 9/1960 | Dick et al. | 220/3.2 |
| 3,236,545 | 2/1966 | Parkes et al. | 220/3.4 |
| 3,718,154 | 2/1973 | Doumany | 137/360 |
| 3,846,604 | 11/1974 | Shallbetter | 220/3.3 |
| 3,952,908 | 4/1976 | Carson | 220/3.8 |
| 4,069,837 | 1/1978 | Jirasek | 137/360 |

FOREIGN PATENT DOCUMENTS 697010  9/1953  United Kingdom ............ 137/361

*Primary Examiner*—Martin P. Schwadron
*Assistant Examiner*—A. Michael Chambers
*Attorney, Agent, or Firm*—Ben E. Lofstedt

[57] ABSTRACT

A rectangular vandal-proof plumbing valve access box for housing at least one plumbing valve therein and for containing same within the wall of a building, including an access cover facing the user-occupied side of the wall with security bolts anchoring the cover to the access box and having a lip extending over the wall about the access box, the box further having a pair of re-inforced rims thereabout with valve locating notches located about one of the rims of the access box.

7 Claims, 5 Drawing Figures

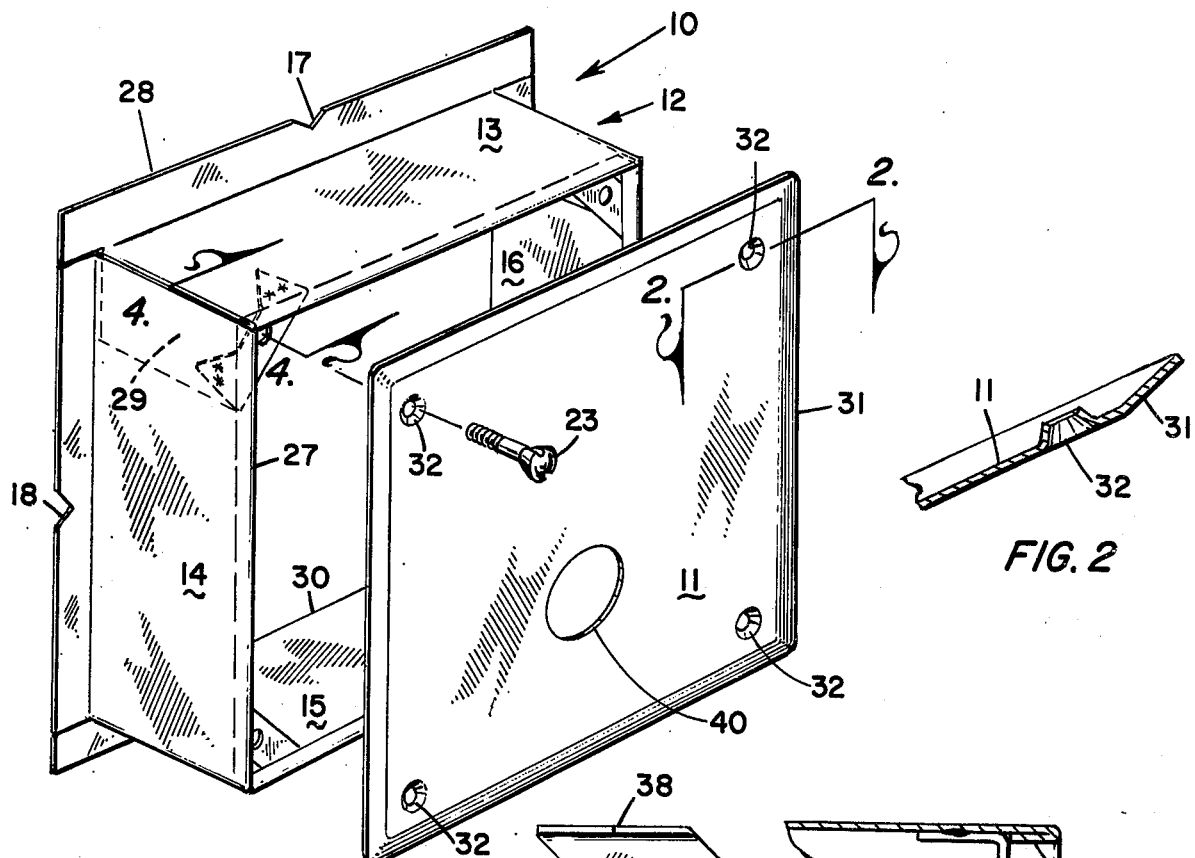
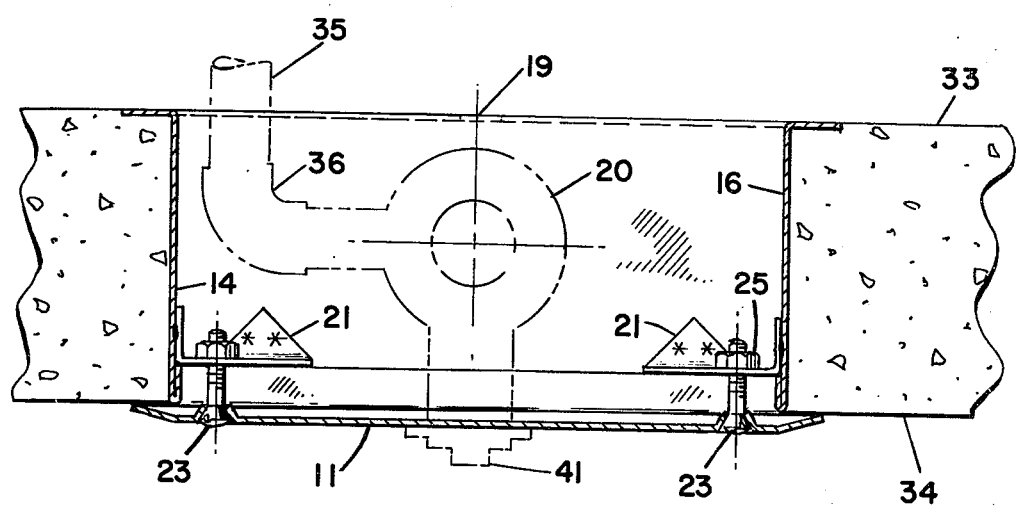

VANDAL-PROOF PLUMBING VALVE ACCESS BOX

This Application for United States Letters Patent is a Continuation in part Application of a prior patent application Ser. No. 749,882, filed on Dec. 13, 1976 and now abandoned.

BACKGROUND OF THE INVENTION

1. Field of the Invention

This invention relates to a wall-contained housing and installation jig for plumbing valves and, more particularly, to a rectangularly-shaped housing and installation jig having a vandal-proof, separable cover for preventing unauthorized access to the housed plumbing valve.

2. Description of the Prior Art

Generally, prior art units have been boxes having hinged, lockable access covers, wherein the access boxes have been formed of relatively heavy and expensive cast metal material.

Additionally, such units, because of the non-separable access covers, had to be precisely fitted to the wall by a front wall reference thereby leaving the rearward portion thereof either extended beyond the rear face of the wall to which the plumbing valve access box was mounted or was short of the wall depth. If too long, it created an obstruction in the pipe case area behind the wall; if too short, a portion of the access box was not supportive of the entire wall thereabove it, thereby creating a weakness therewith.

Other prior art units were formed inexpensively of sheet metal. However, these units did not offer vandal-proof access covers, nor did such units incorporate means for referencing or locating the valve from the rearward portion of the box. Further, such sheet metal units did not employ self-ruggedizing means for substantially improving the strength of the box portion of the housing forming the plumbing valve access box. Still further, these prior art units did not offer the wall installation convenience of adaptably installing the cover thereto regardless of a substantial variation in the distance between the forwardmost rim of the box and the forward face of the building wall in which the box portion of the plumbing valve access box is installed. The forward face of the building wall herein referred to is that which is accessible from the user's side of the wall.

Another feature not found in prior art devices includes the failure to incorporate as part of the re-inforcement means for the box structure, the threaded receptacles for receiving the security bolts for removably anchoring the cover to the box.

SUMMARY OF THE INVENTION AND OBJECTS

Fundamentally, the present invention disclosed herein, is a rectangular vandal-proof plumbing valve access box for housing at least one plumbing valve therein and for containing the valve within the wall of a building, including an access cover facing the user occupied side of the wall with security bolts anchoring the cover to the access box and having a lip extending over the wall about the access box, the box further having a pair of re-inforced rims thereabout with valve locating notches located about one of the rims of the access box.

It is an object of the present invention to provide a plumbing valve access box which is vandal proof.

Another object of the instant invention is to provide a new and improved plumbing valve access box which is formed of re-inforced sheet metal material.

A yet still further object of the invention herein is to provide a plumbing valve access box which is lightweight, rugged and relatively inexpensive.

It is a primary and important object of the invention to provide a plumbing valve access box having a cover thereon which cannot be removed from the side of the wall accessible to the user thereof except by authorized personnel.

Another object of the invention is to provide a vandal-proof plumbing valve access box which includes means for locating the plumbing valve within the box portion of the plumbing valve access box from the rearward facing side of the mounting wall.

The subject matter which I regard as my invention is particularly pointed out and distinctly claimed in the concluding portion of this Specification. The invention itself, however, both as to its organization and method of operation, together with further objects and advantages thereof, may be better understood by reference to the following description taken in connection with the accompanying drawings:

BRIEF DESCRIPTION OF THE DRAWINGS

FIG. 1 is a perspective view of the present invention.

FIG. 2 is a view taken along Plane 2—2 of FIG. 1.

FIG. 3 is an enlarged view of a corner section of the box portion of the invention.

FIG. 4 is a view of the present invention taken along Plane 4—4 of FIG. 1.

FIG. 5 is a rear view of the corner-reinforcing bracket and threaded receptacle of the box portion of the invention.

DESCRIPTION OF THE PREFERRED EMBODIMENT

With continued reference to the drawings, it is clearly shown that the plumbing valve access box of the present invention is generally designated at 10, and is generally rectangularly shaped, having four sidewalls 13, 14, 15 and 16 and two open ends 27, 30. One open end 27 faces the front of the access box 10 and an open end 30 faces the rear of the access box 10.

A flange 28 rims the periphery of the open end 30 and is directed outwardly in a radial fashion away from the central axis of the access box 10.

The flange 28 is notched with a number of V-notches 17, 18, 19 and an additional V-notch (not shown) which is arranged in complementary, face-to-face opposition to notch 18. The apexes of the V-notches are utilized to define reference planes and to establish locating points for the installation of, typically, a single flushing valve housed therein. In this particular arrangement, the apex of the V-notch 17 is aligned with the apex of the V-notch 19 in opposite disposition thereto. Similarly, the apex of the V-notch 18 is aligned with the apex of the V-notch not shown which is arranged in opposite disposition to the V-notch 18 on the flange 28. The reference plane which is defined by the alignment of the apex of V-notch 17 with the apex of the V-notch 19 intersects the corresponding reference plane defined by the apex of the V-notch 18 and the apex of the V-notch not shown. This intersection and the reference planes themselves, are used to align the pushbutton 41 of the flush valve 20. Further use and application of the V-notches to provide a means for determining the alignment of the flush valve 20 and the pushbutton 41 relative to other parts of the invention other than the plumbing valve access box 10 will become clearer as the description proceeds herein.

The rim about the open end 27 facing the front is folded back against itself to re-inforce the rim. Additionally, the edge of the folded back portion serves as a reference means as hereinafterwards described.

Adjacently disposed along the inside of each of the corners formed by the sidewalls 13, 14, 15, 16 of the access box 10 is a re-inforcing bracket 2 with a threaded receptacle 25 therein to threadably receive a security bolt 23, the purpose of which will be readily understood as the description of the invention proceeds further herein.

With special reference now to FIGS. 3 and 5, the bracket 2 is depicted in detail. A pair of arms 37, 38 are formed at right angles to the balance of the bracket 2 body and are typically secured to a pair of sidewalls forming a corner of the access box 10 by tack welding them to the sidewalls. A nut 25 is welded to the bracket 2 after the nut 25 has been aligned with a hole (not shown) therein. Not only does the folded back portion act to stiffen and strengthen the open end 27 of the access box 10, but it substantially maintains dimensional integrity of the interior cross-section of the access box 10 and does not reduce the cross-section which would occur if the folded back portion, instead of being folded back, was projected radially inwardly towards the geometric center of the access box 10 from the open end 27. It should be noted that the folded back portion about the inside of the open end 27 of the access box 10 presents an edge against which the brackets 2 are placed in order to positionally space the brackets 2 substantially away from the cover 11, that is, substantially more than merely the thickness of the sheet metal used to form the access box 10. This results in an improved "force couple" by utilizing a greater portion of the length of the shank of the bolt 23, that is, the distance between the head of the bolt 23 where the bolt mates with the cover 11 and where the threaded portion of the shank is mated with the corresponding threaded receptacle 25 in the brackets 2.

This "force couple" arrangement is important because if a person attempts to pry the cover 11 away from the wall in which the access box 10 is mounted, since the resistance to the force of prying will be a portion of the length of the shank to the threaded receptacle 25 in the bracket 2 mathematically multiplied by the force existing at the head of the security bolt 23 in the cover 11, the vandal-proofing characteristics of the assembly is improved.

It should be noted at this time that the threaded receptacles 25 are conveniently constructed by nuts welded or brazed to the brackets 2.

A vandal-proof access cover 11 is provided to present a means for closing and opening the open end 27 of the box 10 to allow access to the valve 20 in the access box 10. The cover 11 has a rimmed portion 31 which is directed rearwardly. Additionally, four apertures 32 are positioned in each of the four corners and are alignable with the threaded receptacles 25 in the four brackets 2.

Generally, the flush valve 20 may be installed from either the front side of the access box 10 which is defined by open end 27 or from the rear side of the access box 10 which is defined by open end 30. However, if the flush valve 20 is installed from the front side of the box 10, the alignment of the pushbutton 41 with the aperture 40 in the cover 11 must be tested to determine whether or not the alignment therewith is proper. If the alignment is not proper, then the cover 11 will not be centered appropriately with the opening 27 of the access box 10 and, likely, will not be anchorable with the nuts 25 in the brackets 2 via the apertures 32 with the security bolts 23 because of this non-alignment. Proper alignment of the pushbutton 41 with the aperture 40 in the cover can be accomplished by installing the pushbutton 41 in the aperture 40 prior to installation of the valve 20 with its supply piping 35 which is fluidly coupled to the flush valve 20 via the elbow 36 and securing the cover 11 fixedly to the box 10 via the security bolts 23 as previously described.

On the other hand, if the flush valve 20 is installed from the rear opening 30 when the cover 11 is not secured yet to the box 10, then the pushbutton 41 of the valve 20 may be properly aligned and installed so that when the cover 11 is placed over the front opening 27, the pushbutton 41 will be aligned with the aperture 40 in the cover 11. This is accomplished by directing the center of the pushbutton's face into coincidence with the intersection of the planes defined by the V-notches 17, 18, 19 and the V-notch which is complementary to 18 as previously discussed herein.

Security bolts 23, bolts which have special heads requiring special tools for engagement and disengagement from the threaded receptacles, are passed through the apertured portions 32 having annular recesses thereabout for cradling the headed portions of the security bolts 23, and, are thereafterwards threadably engaged with the threaded receptacles in the respective brackets 2.

When the cover 11 is secured to the brackets 22 and tightened via the bolts 23, the rearwardly directed rimmed portion 31 is caused to come into intimate engagement with the face 34 of the wall in which the access box is mounted. Such intimate engagement prevents the insertion of prying devices such as screwdriver blades inbetween the face 34 of the wall and the rimmed portion 31. Additionally, the rearward direction of the rimmed portion 31 of the cover 11 acts as a re-inforcing and strengthening agent for the cover 11 rendering it more rugged.

The flange 28 about the rear opening 30 of the access box 10 also acts to strengthen and reinforce the rimmed portion.

The invention in its broader aspects is not, however, limited to the specific details shown and described but departures may be made from such details without departing from the principles of the invention and without sacrificing its chief advantages.

What is claimed is:

1. A vandal - proof plumbing valve access box for placement in an aperture in a mounting wall having a front face and a rear face for housing a plumbing valve and for preventing access thereto by unauthorized persons or vandals while permitting actuation of a pushbutton of the plumbing valve; comprising:

(a) a sleeve defined by a wall thereabout, said wall of said sleeve being co-extensively disposed between the pair of oppositely - disposed faces of said mounting wall and defining a single, rectangularly - shaped passageway therethrough, said sleeve having front and rear portions with rims thereabout and having a first flange disposed about the rim of said rear portion of said sleeve, said first flange being directed outwardly in a radial fashion therefrom, whereby said sleeve is stiffened and strengthened and may be positioned in said aperture in said mounting wall and when said first flange is abuttingly positioned thereabout it prevents said sleeve from being moved further through said aperture in said mounting wall so that said front portion of said sleeve does not project beyond the front face of said mounting wall;

(b) four brackets, each of said brackets being formed from a piece of rectangularly-shaped sheet metal wherein a pair of the complementary corners are bent along a diagonal line passing through the adjacent non-complementary corner, said corners following said bending are each disposed in a plane, said planes being disposed at right angles to one another and wherein said brackets are arranged to bridge the inside corners of said sleeve and respectively secured in fixed relationship to the intersection of adjacent sidewalls of said sleeve forming each of said corners, each of said brackets further having an aperture therethrough with a threaded portion thereabout;

(c) a cover for said sleeve, said cover extending beyond the rim of said sleeve and having at least four apertures adjacently disposed to each of the four corners thereof and having an apertured portion therein for the pushbutton for operating said plumbing valve; and (d) security bolts for said apertures in said cover, said bolts being mateably receivable in threadable fashion with said threaded apertures in said brackets.

2. The plumbing valve access box of claim 1, wherein said first flange of said sleeve further comprises a plurality of paired, oppositely - disposed V shaped notches in the edge thereof, said pair of V-shaped notches, each having an apex, one pair of apexes defining a vertical reference line and the other pair of apexes defining a horizontal line, said reference lines intersecting to define an alignment position for said plumbing valve during installation in said sleeve absent said cover so that when said cover is thereafterwards installed, the pushbutton of said plumbing valve will project through said cover aperture.

3. The plumbing valve access box of claim 2, wherein said intersection of said reference planes is aligned with the center of the pushbutton.

4. The plumbing valve access box of claim 1, further including a second flange disposed about the rim of said front portion of said sleeve to strengthen the rim thereof.

5. The plumbing valve access box of claim 4, wherein said second flange is arranged to be disposed against the respective sidewall forming said sleeve to further strengthen the rim thereof and to form a reference edge thereabout against which said brackets are abutted to space said brackets away from the front opening of said access box.

6. The plumbing valve access box of claim 5, wherein said reference edge is disposed beyond the thickness of the sheet material forming the sleeve of the access box.

7. The plumbing valve access box of claim 6, wherein said brackets are abutted against said reference edge formed by said second flange about the front portion of said sleeve to recess said brackets from the edge of the rim of the front portion of said sleeve, whereby when said security bolts are used to secure said cover about said front portion of said sleeve, the distance between the head of the security bolt and the threaded portion of the shank of said bolt threadably mated with said threaded apertures in said brackets is a substantial portion of said shank length to improve the anchoring effect of said bolts between said cover and said brackets.

* * * * *